(12) United States Patent
Orsello

(10) Patent No.: US 9,239,171 B2
(45) Date of Patent: Jan. 19, 2016

(54) SYSTEM AND METHOD FOR HEAT REJECTION IN A SOLAR POWER COLLECTION SYSTEM

(76) Inventor: Robert Orsello, Scottsdale, AZ (US)

(*) Notice: Subject to any disclaimer, the term of this patent is extended or adjusted under 35 U.S.C. 154(b) by 913 days.

(21) Appl. No.: 13/498,475

(22) PCT Filed: Oct. 7, 2010

(86) PCT No.: PCT/US2010/051817
§ 371 (c)(1),
(2), (4) Date: Mar. 27, 2012

(87) PCT Pub. No.: WO2011/044358
PCT Pub. Date: Apr. 14, 2011

(65) Prior Publication Data
US 2012/0260908 A1    Oct. 18, 2012

Related U.S. Application Data

(60) Provisional application No. 61/249,278, filed on Oct. 7, 2009.

(51) Int. Cl.
| F24J 2/00 | (2014.01) |
| F24J 2/16 | (2006.01) |
| F24J 2/32 | (2006.01) |
| F24J 2/34 | (2006.01) |
| F24J 2/52 | (2006.01) |

(52) U.S. Cl.
CPC .... F24J 2/16 (2013.01); F24J 2/32 (2013.01); F24J 2/345 (2013.01); F24J 2/5243 (2013.01); Y02E 10/44 (2013.01); Y02E 10/47 (2013.01)

(58) Field of Classification Search
CPC ......... F24J 2002/5216; F24J 2/16; F24J 2/32; F24J 2/34; F24J 2/5243
USPC .................................................. 126/714, 634
See application file for complete search history.

(56) References Cited

U.S. PATENT DOCUMENTS

| 4,088,121 A | 5/1978 | Lapeyre |
| 4,187,123 A | 2/1980 | Diggs |
| 4,205,659 A | 6/1980 | Beam |
| 4,509,501 A * | 4/1985 | Hunter ........................ 126/602 |
| 4,606,327 A * | 8/1986 | Bloor et al. .................. 126/569 |
| 4,832,002 A * | 5/1989 | Medina ........................ 126/577 |
| 5,445,177 A * | 8/1995 | Laing et al. .................. 136/246 |
| 6,217,178 B1 * | 4/2001 | Drumheller et al. .......... 359/849 |
| 7,380,549 B1 | 6/2008 | Ratliff |
| 8,104,893 B2 * | 1/2012 | Reznik et al. ..................... 353/3 |
| 8,413,944 B2 * | 4/2013 | Harberts et al. .............. 248/500 |
| 2009/0158736 A1* | 6/2009 | Mierisch ...................... 60/641.8 |
| 2010/0089389 A1* | 4/2010 | Seery et al. ................... 126/608 |
| 2011/0137458 A1* | 6/2011 | Hisatani et al. ............... 700/248 |
| 2011/0240007 A1* | 10/2011 | Currier ........................ 126/606 |

FOREIGN PATENT DOCUMENTS

DE    102007052338 A1    5/2009

* cited by examiner

*Primary Examiner* — Avinash Savani
(74) *Attorney, Agent, or Firm* — Angela M. Brunetti

(57) ABSTRACT

A heat rejection system for a solar power collector having an array of heliostat mirrors, the heat rejection system having a rail system supporting the array of heliostat mirrors, the rail system having a plurality of thermally conductive pipes, a reservoir positioned underground and connected to the rail system, a condenser connected to the thermally conductive pipes and the reservoir, and a coolant means circulating through the thermally conductive pipes, condenser and reservoir the heat rejection system operates as closed systems without the consumption of water and returns solar heat to the environment.

17 Claims, 7 Drawing Sheets

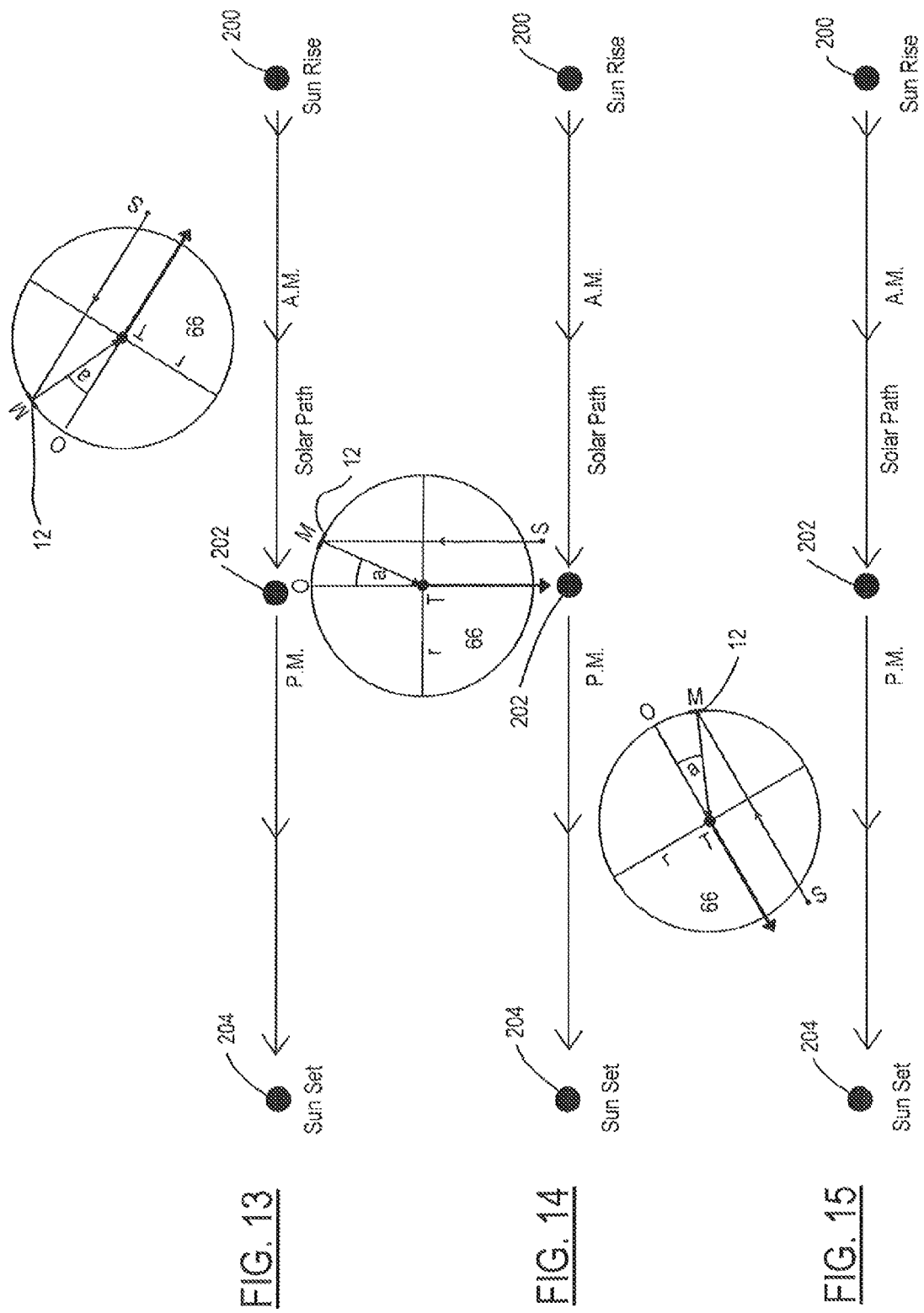

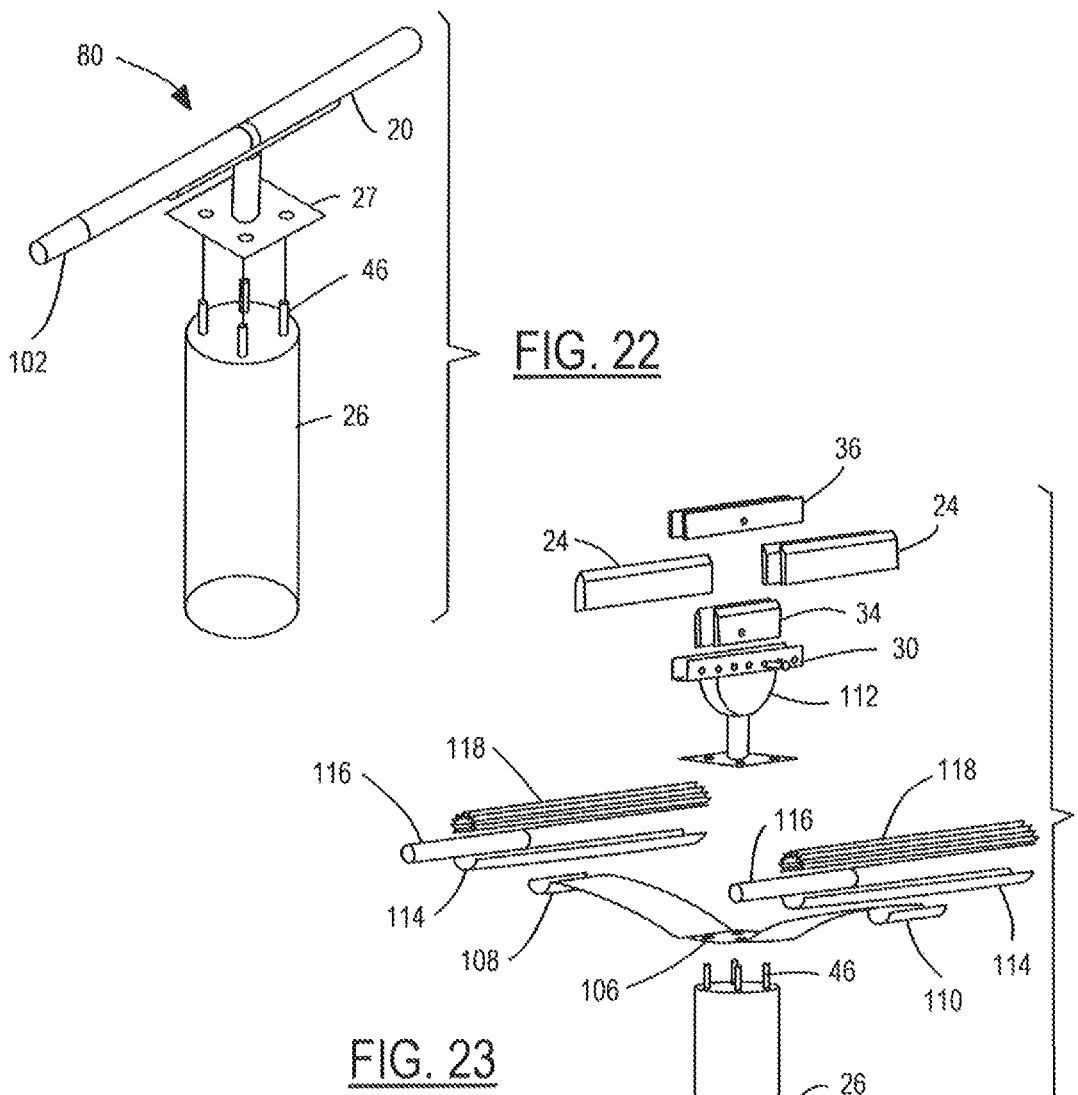
FIG. 22
FIG. 23
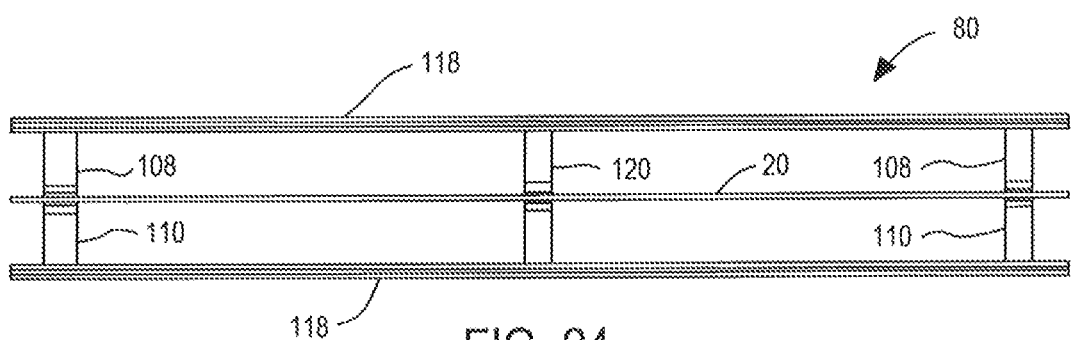
FIG. 24

SYSTEM AND METHOD FOR HEAT REJECTION IN A SOLAR POWER COLLECTION SYSTEM

CROSS REFERENCE

This application claims the benefit of the filing date of PCT Application having international Serial No. PCT/US2010/051817, filed Oct. 7, 2010, entitled "System and Method for the Large Scale Gathering and Concentration of Solar Thermal Energy", which claims priority from U.S. Provisional Application Ser. No. 61/249,278, filed Oct. 7, 2009, entitled "System and Method for the Large Scale Gathering and Concentration of Solar Thermal Energy", the entire disclosures of which are hereby incorporated by reference into the present disclosure. This application is related to U.S. patent application Ser. No. 13/498,442 now U.S. Pat. No. 9,029,747 filed Mar. 27, 2012, entitled "Method and System for Concentration of Solar Thermal Energy", the entire disclosure of which is hereby incorporated by reference into the present disclosure.

TECHNICAL FIELD

The inventive subject matter relates to a solar power collection system and more particularly to a method of heat rejection in a solar power collection system that does not consume water.

BACKGROUND

A solar power collection system is basically a heat based engine. For any heat based engine, heat is supplied and heat is exhausted. The usable work generated by an ideal heat engine is the difference between the heat supplied and the heat exhausted. In a heat engine, work is extracted during the flow of heat through the engine from a hot supply side to a point of lower thermal energy called a cold side. While heat supplied is considered the fuel of the system, heat rejection is imperative to avoid heating up the cold side to the point that it matches the hot supply side, causing the engine to cease operating. The efficiency of a heat engine is the percentage of how much initial supply side heat is converted into useful work, with the remainder to be exhausted, or rejected.

For a typical heat engine, fuel is brought in and converted into thermal energy for supply heat must be pushed beyond the heat engine, or the engine will heat up and cease to operate. Most heat rejection systems employ water to accomplish this, such as steam evaporation. Cooling of the steam from a vapor to a liquid requires significant heat rejection and is typically handled by using a cold water source. Traditionally, lakes and rivers were used to reject this heat because they provide an enormous capacity to accept and remove heat. However, water consumption, and the adverse effect thereof, is a concern in such heat rejection systems.

Some designs employ a radiator-like serpentine of pipes and heat fins that carry exhaust steam within, while sprinklers spray water mist over their outer surface, thereby cooling the steam and heating the environmental water. The supplied cooling water, which is now heated, cools naturally by accelerated evaporation that places large amounts of steam and humidity into the air. Again, the consumption of water is also an undesirable aspect of such designs.

In a solar power collection system, the supply heat is an indigenous component to the environment and is a natural component of the solar power collection system. The surface area of the solar power collection system, which is used to collect solar thermal energy as a source to a heat engine, is sufficient to accept and hold any rejected heat. More importantly, the eco-system of the area which supports the solar power collection system depends upon it.

An example of a heat engine may be found in a current method for the large scale collection and concentration of solar thermal energy. The heat engine uses an array of heliostat mirrors to reflect the sun's rays to a central receiver. By utilizing multiple heliostat mirrors in the array, each one reflecting to a common point, concentration of solar thermal energy is achieved.

In these known systems, heliostat mirrors are set in a fixed position surrounding the tower. The mirror surfaces are typically controlled in two degrees of motion to position the surface of the mirror with respect to the tower. Each heliostat mirror has a control system which tracks the motion of the sun with respect to the centrally located receiver. The mirror is continuously moved to maintain the solar reflection from the surface of the mirror onto the receiver. The purpose of positioning the heliostat mirrors being to reflect and direct the sun's rays to a designated central collection point, known as a central target receiver or a power tower. In order to accomplish this, the heliostat mirror requires a surface area of reflective mirror, two axes of motion, a servo motor for each axis of motion and a control system for positional calculation and motion control of the two axes.

There is a need for a solar power collector that is capable of sustaining the rejection of heat.

SUMMARY

A heat rejection system for a solar thermal power collector having an array of heliostat mirrors. The heat rejection system has a rail system supporting the heliostat mirrors and the rail system has a plurality of thermally conductive pipes. A reservoir positioned below ground is connected to the thermally conductive pipes. A condenser is connected to the thermally conductive pipes and the reservoir. Coolant means is circulated through the pipes, the condenser and the reservoir to operate the heat rejection system without the consumption of water.

A method for rejecting heat in a solar power collection system uses a combination of geothermal and air radiant heat conduction. The method for rejecting heat having an array of heliostat mirrors is provided in which coolant means is circulated throughout a rail system suspended above the ground and having a plurality of thermally conductive pipes. The coolant means is also circulated through a sub-grade reservoir and a sub-grade condenser to dissipate excess heat by both means, radiation and geothermal conduction, without the consumption of water.

DESCRIPTION OF DRAWINGS

FIG. 13 is a circle diagram illustrating a clockwise rotation of the inventive subject matter at sun rise;

FIG. 14 is a circle diagram illustrating a clockwise rotation of the inventive subject matter at solar noon;

FIG. 15 is a circle diagram illustrating a clockwise rotation of the inventive subject matter at sun set;

FIG. 22 is a top view of a section of heat rejection and rail system according to the inventive subject matter.

FIG. 23 is an exploded perspective view of an embodiment of the inventive subject matter; and FIG. 24 is a top view of an embodiment of the heat rejection system of the inventive subject matter.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the inventive subject matter. In the figures, like reference numbers will be used to illustrate the same components. Those skilled in the art will recognize that the various components set forth herein may be altered without varying from the scope of the inventive subject matter.

Figure 1:
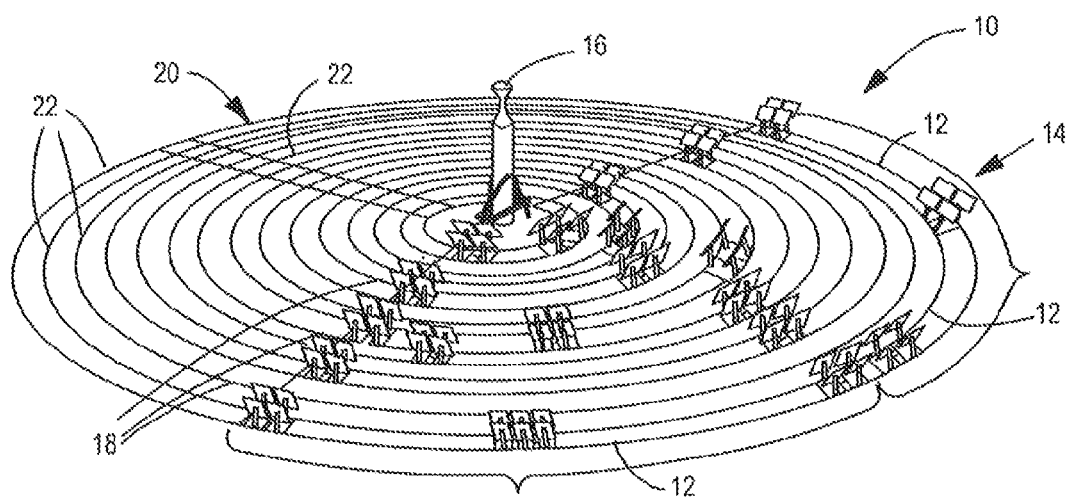
FIG. 1 is an overall view of a solar power collection system of the inventive subject matter.

FIG. 1 is an overall view of a solar power collection system 10 according to the inventive subject matter. A plurality of heliostat mirrors 12 forms an array 14 that is positioned around a centrally located receiver 16. The array 14 has a plurality of rows 18. Each row 18 of heliostat mirrors 12 in the heliostat array 14 is movable, horizontally, about the centrally located receiver 16. The heliostat array 14 is positioned upon a rail system 20. The rail system 20 is fixed to the ground as concentrically positioned rails 22 to form a circular pattern about the centrally located receiver 16. The number of rows 16 and rails 22 in the system 10 shown in FIG. 1 is for example purposes only. One skilled in the art is capable of determining the number of rows necessary for a particular installation depending on the power plant specifications.

Figure 2:
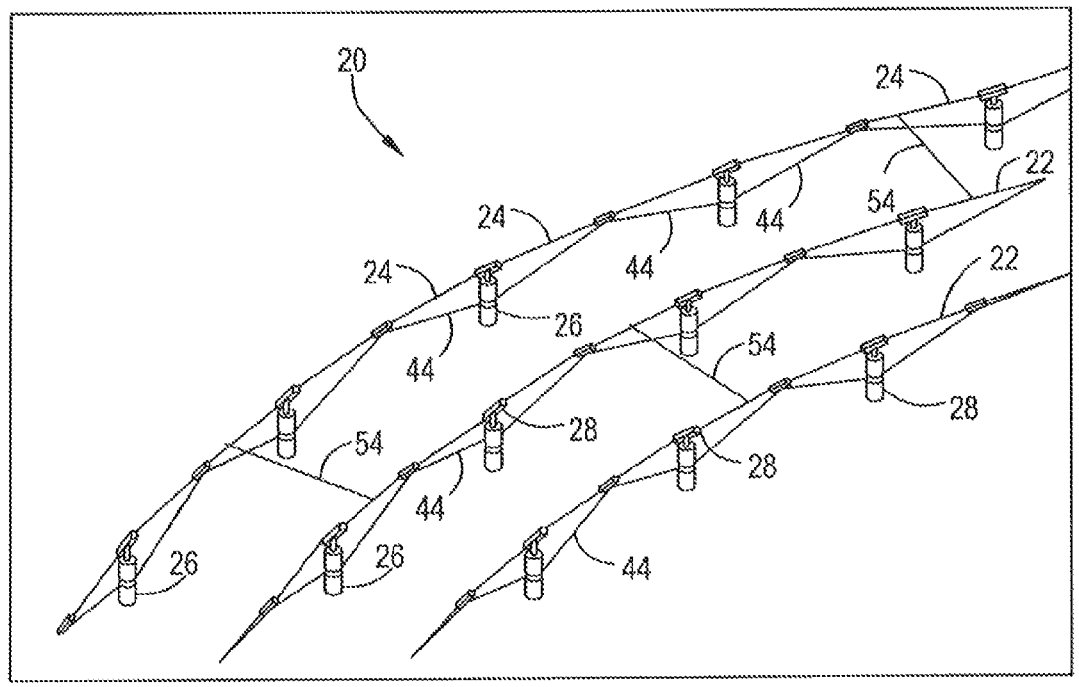
FIG. 2 is a perspective view of a section of supported raised rail system according to the inventive subject matter.

FIG. 2 is a section detail of the rail system 20 of the inventive subject matter. The rail system 20 of the inventive subject matter is a modular system in that each of the concentrically positioned rails 22 are defined by a plurality of rail sections 24 that are joined at a pedestal 26. In the example shown herein, a V-shaped configuration of the rail section 24 is detailed for example purposes only. It should be noted that the V-shaped rail sections 24 may be substituted with angle, I-beam, C-channel, or other configurations too numerous to mention herein. A rail union bracket 28 supports and joins two rail sections 24 at the pedestal 26. The rail sections 24 may have fixed length and are dimensions making the sections modular for ease of installation. Each rail section is an integer segment of a concentric rail 22. The number of rail sections 24 will determine the diameter of each concentric rail 22. In an example embodiment, the rail sections 24 have an arc pitch of 6π and an arc length of 18°, maintaining a constant dimension that is easily assembled into a plurality of concentric rails 22 using any number of rail sections 24.

Figure 3:
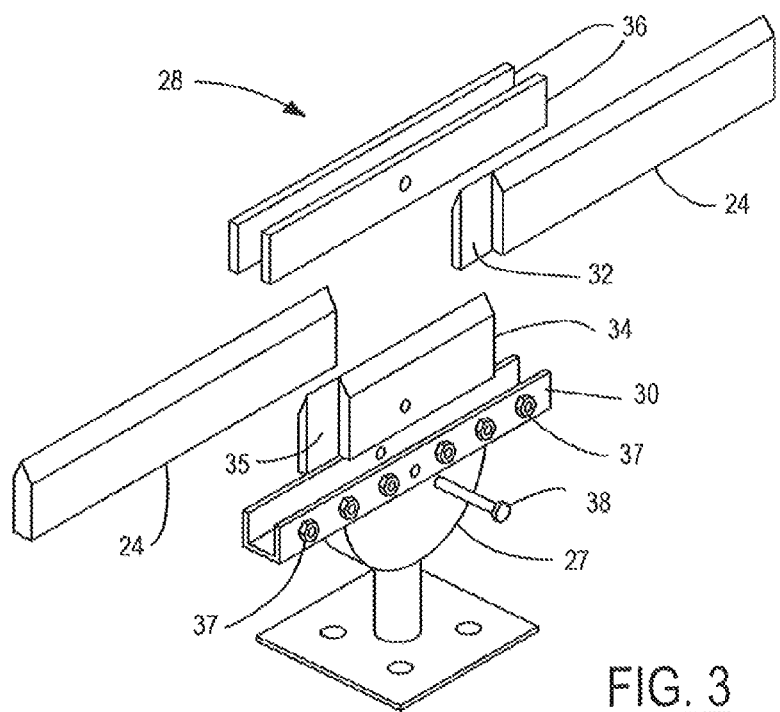
FIG. 3 is an expanded view of an embodiment of a rail union bracket of the inventive subject matter.

FIG. 3 is an expanded view of an embodiment of a rail union bracket 28 according to the inventive subject matter. A channel section 30 is mounted to the pedestal 26 by a mounting bracket 27 and receives two rail sections 24. Each rail section 24 has a cut-away segment 32. A rail union joint 34 is positioned in the channel section 30 between each rail section 24 and overlaps with the cut-away segment 32 of each rail section 24. The rail union joint 34 has cut-away segments 35 at each end that abuts the cut-away segments 32 of the rail sections 24. A set of bushings 36 is positioned within the channel section 30, between the walls of the channel section 30 and the rail sections 24 and rail union joint 34. A connector, such as a union pin 38, or other suitable device, holds the channel section 30, bushings 36 and rail union joint 34 in place. The set of bushings 36 frictionally engage the rails 24 and the rail union joint 44 within the channel section 30. Set screws 37 may be implemented to adjust the tension of the bushings 36 against the channel section 30 and with the rail sections 24.

Figure 4:
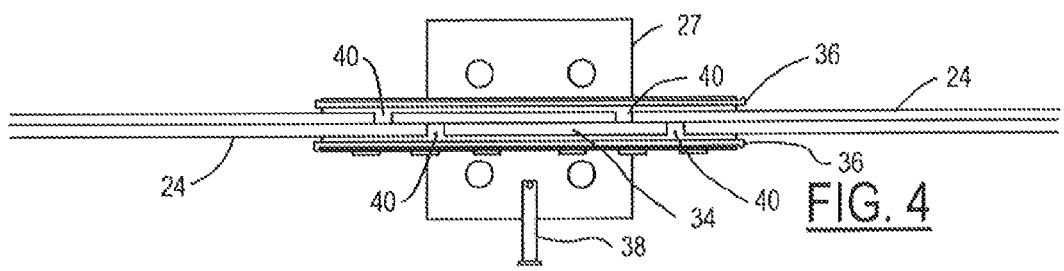
FIG. 4 is a top view of the bracket of FIG. 3.

FIG. 4 is a top view of the rail sections 24 joined by a rail union bracket 28. Spaces 40 exist between the rail union joint 34 and the rail sections 24 to allow limited movement of the rail sections 24 and union joint 34 to accommodate possible expansion and contraction of the rails sections 24 and union joint 34. The bushings 36 also serve the purpose of aligning the rail sections 24 and the union joint 34 to maintain an even center line for the concentric rail 22.

Referring again to FIG. 2, rail support brackets 42 may be placed between pedestals 26 as needed to add further support to the rail system 20. Support struts 44 are connected at the rail support brackets 42 and at the pedestal 26. The rail support brackets 42 and struts 44 add stability to the rail system and increase a load that is to be supported by the rail system 20.

Figure 5:
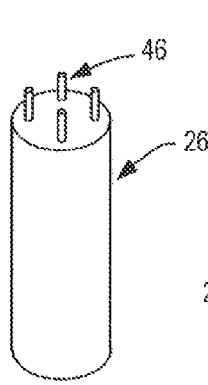
FIG. 5 is a perspective view of an embodiment of a pedestal.
Figure 6:
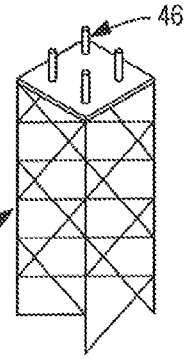
FIG. 6 is a perspective view of another embodiment of a pedestal.

The rail system 20 may be affixed directly to the ground surface. However, in another embodiment of the present invention, shown in FIG. 2, the rail system 20 is raised above the ground a predetermined distance in order to minimize disturbance of the land area. The pedestal 26 is positioned under the rail sections 24, secures the rail sections 24 and attaches to the ground in a manner that the environment is minimally encroached. FIG. 5 shows a possible configuration for pedestal 26. A concrete riser or sturdy cardboard tube filled with a material, such as concrete, having a bolt pattern 46 for attaching the rail union bracket 28 channel section 30 to the pedestal 26 is shown. FIG. 6 is yet another possible configuration which shows a lattice steel structure for the pedestal 26. One skilled in the art is capable of modifying the pedestal and rail cooperation in any manner of possible configurations without departing from the scope of the inventive subject matter.

Figure 7:
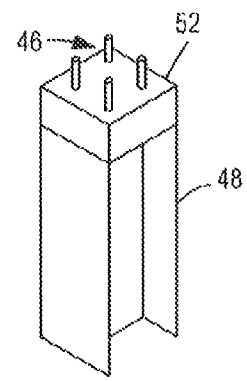
FIG. 7 is a perspective view of an embodiment of a piling pedestal.
Figure 8:
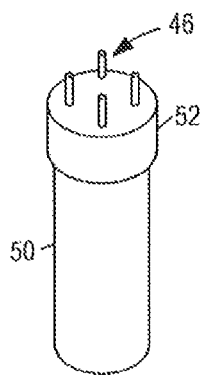
FIG. 8 is a perspective view of another embodiment of a piling pedestal.

In still another embodiment, the pedestal 26 is driven into the earth so that a section of the pedestal extends below the ground. In the embodiments shown in FIGS. 7 and 8, pilings are shown. In FIG. 7 an I-beam style piling 48 is shown and in FIG. 8 a cylindrical style piling 50 is shown. The piling styles shown are for example purposes only. One skilled in the art is capable of substituting the piling shape without departing from the scope of the inventive subject matter. In each piling configuration, a cap 52 having the bolt pattern 46 for attaching the rail union bracket 28 is attached to the piling.

Figure 9:
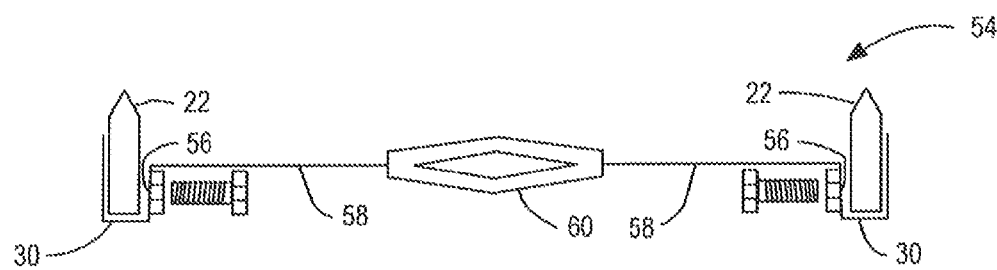
FIG. 9 is an end view of a support strut of the inventive subject matter.

Referring again to FIG. 2, in any given installation, the number and positioning of the pedestals 26 will vary and one skilled in the art is capable of making this determination. While minimal encroachment of the environment is one advantage of the raised rail system 20, other advantages may be realized such as ease of installation, maintenance and repair of the rail system and/or the heliostat array. The rail system 20 may also include intra-rail supports 54. Intra-rail support maintains position and stability of concentric rails 22 of the rail system 20. Referring now to FIG. 9, an end view of an intra-rail support 54 is shown. A bracket 56 attaches a strut section 58 to each channel section 30. A single strut section 58 may be used, but in the embodiment shown in FIG. 9, a turn buckle 60 connects two strut sections 58 to provide intra-rail support, yet accommodate any movement that may occur in the rail system 20.

Figure 10:
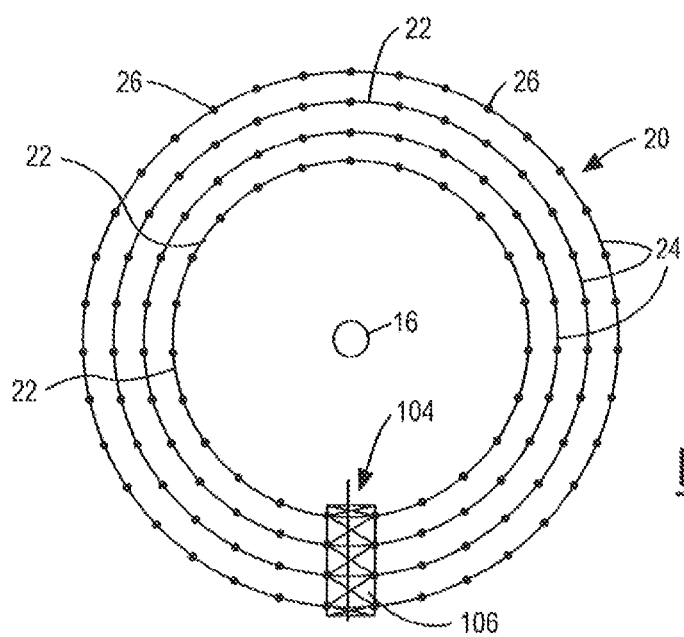
FIG. 10 is a top view of a full circle solar power collection system of the inventive subject matter.
Figure 11:
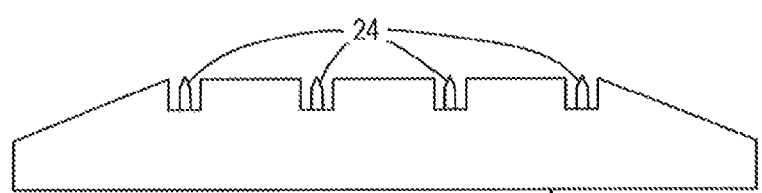
FIG. 11 is a side view of an access driveway according to the inventive subject matter.

Referring back to FIG. 1, the rail system 20 covers an area surrounding the receiver 16 and is a complete circle. FIG. 10 is a top view showing a plurality of concentric rails 22 in a full 360° rail system 20. The full circle rail system 20 may have an access section 104 in which a driveway 106 is positioned between pedestals 26 and the rail sections 24 are inset in the driveway 106. This allows the heliostats to move over the full circle yet still provide an access point to the receiver 16. FIG. 11 is a side view of the driveway 106 with recessed rail sections 24.

Figure 12:
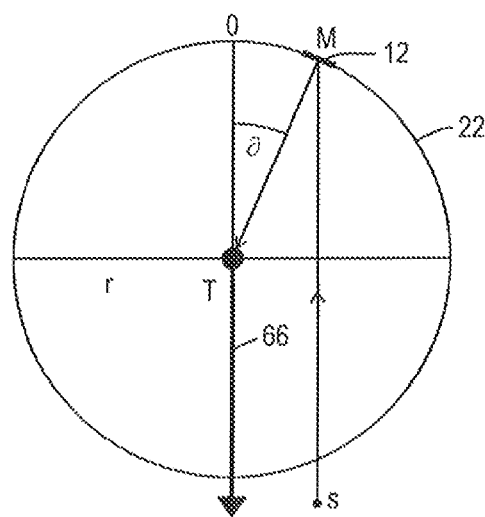
FIG. 12 is a circle diagram illustrating a single mirror and its clockwise rotation about a receiver with respect to the Sun.

The inventive subject matter provides a two dimensional model for solar tracking that will be described herein with reference to an overhead view of a single concentric rail as shown in FIG. 12. The single concentric rail 22 having an arbitrary radius, r, is centered at point, T. Assume that a single mirror, 12 is mounted at point, M on the rail 22. An angle, $\partial$ is defined to be [O, T, M], where O is designated as a zero angle, T is the center point, M is the position of the mirror 12, and a clockwise motion is positive rotation. An arrow 66 is pointing directly at the sun. A vector (S M) identifies one ray of solar radiation, or flux, and is parallel to all other rays of solar flux. In this configuration, the mirror point, M, may be permanently positioned to reflect the solar flux ray (S M) back to the target point, T, along the path (M T). When the mirror 12 rotates freely about the center point T, the mirror point M moves about point T with a radius, r. A control system may be used to maintain the arrow 66 in a position that points directly at the sun. The angle, $\partial$, will remain constant and the mirror point, M, will always be positioned to reflect the solar flux ray (S M) back to the center point, T.

Referring now to FIGS. 13, 14 and 15, there are shown three positions of the circle 64 as it rotates in a counterclockwise direction. In reality, the sun is tracked with and azimuth angle and solar elevation. In this two dimensional example, the solar elevation is always zero and the circle 64 is rotated towards the sun to keep the system relative to azimuth angle a constant 180 degrees. This rotation is illustrated in the three positions shown in FIGS. 13-15 which trace the clockwise rotation of circle 64 as it aligns to the position of the Sun beginning at the sun rise 200, FIG. 13, through solar noon 202, FIG. 14 and at sun set 204, FIG. 15. A single axis of tracking is necessary to align the circle 46 toward the sun's position. However, the position of the mirror, 12, remains fixed on the circle 64. According to the inventive subject matter, a plurality of mirrors 12 forming the array 14 are mounted to the rail system 20 and positioned to rotate the array 14 and mimic the movement of the circle 64 as shown in FIGS. 13-15. For any number of mirrors, a single control motor may be required to simply rotate the array to track the sun's position.

Referring back to FIG. 1, the array 14 is comprised of a plurality of rows 18 of having a plurality of heliostat mirrors 12 in each row. The array 14 takes up a section of the rail system that is less than the complete 360 degree circle of rail in the rail system 20. As mirror positions extend past quadrant points of the receiver, the angle of tilt for the mirror to reflect the sun to the receiver diminishes the effective area of the mirror, thereby reducing its effectiveness. This effect is referred to as cosine effect and is a function of the position of the mirror with respect to the Sun, the receiver 16 and a solar elevation angle.

Figure 16:
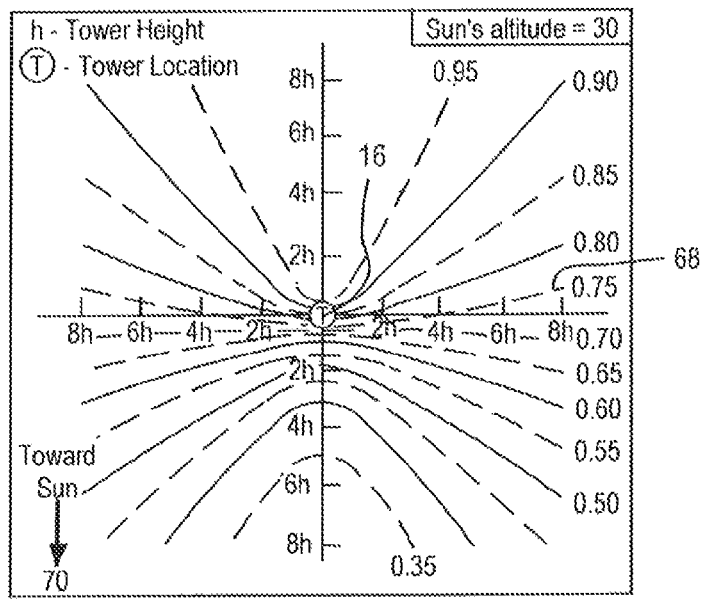
FIG. 16 is a graph depicting cosine efficiency.

In a preferred embodiment, the dimensions of the array 14 may be determined by applying the concept of cosine efficiency. The question to answer in determining the number of mirrors necessary is a question of cost versus collection gain. During solar noon, even mirrors that are positioned on the south side of receiver 16 have adequate performance due to the overhead angle of the Sun. The level of performance, however, falls sharply, when the sun is not in an optimal position, which is, unfortunately, most of the day. FIG. 16 is a graph showing a positional gradient of the cosine efficiency based on the location of a mirror 12 with respect to the receiver 16 and the Sun. The optimal spot for collection of solar flux rays is located in a semicircle, or boundary line, 68 surrounding the central receiver 16 opposite the sun. The boundary line 68, based on cosine efficiency, is preferably 75 percent. The shaded area represents the shape of the array 14.

Figure 17:
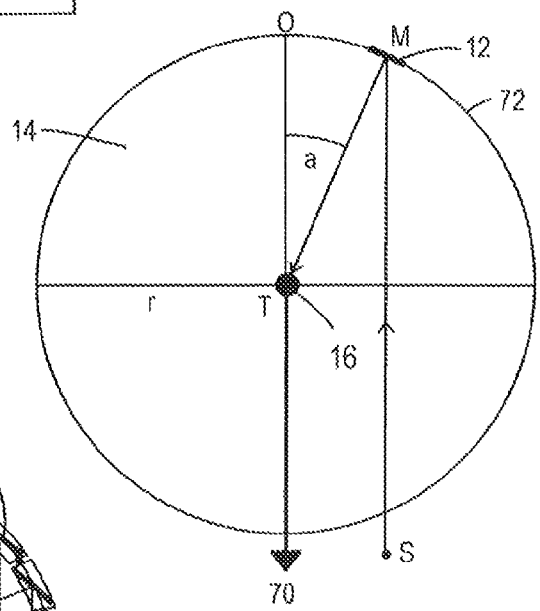
FIG. 17 is a graph illustrating an embodiment of an array in the solar power collection system of the inventive subject matter.

According to the inventive subject matter, the array 14 moves concentrically about the receiver 16 so that it is always opposite of the sun 70. The system of the present invention provides a significant advantage over a fixed position heliostat in that it maximizes the cosine efficiency of the entire array 14 throughout the day. FIG. 17 is a depiction of an array shape according to one embodiment of the inventive subject matter in which the array 14 is a fan-shaped arc section of a circle that is approximately 160 degrees about the receiver 16. In this embodiment, cosine efficiency of the entire array 14 is maximized at approximately 75 percent.

Figure 18:
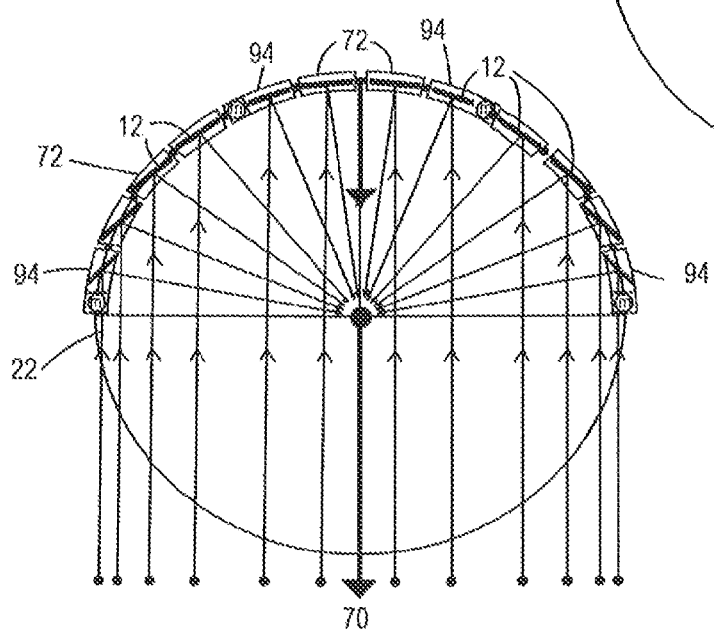
FIG. 18 is view of a cart train according to the inventive subject matter.

The array 14 is moved about the receiver 16 on the rail system 20 in order to always be opposite of the Sun. By using this tracking model, a more simplified heliostat control system may be implemented. According to this tracking, each heliostat mirror 12 maintains a fixed position with respect to the solar azimuth and the receiver throughout the solar day. Under this circumstance, the heliostat mirror 12 only has to compensate for the solar elevation angle. At least one heliostat mirror 12 is positioned on a movable cart 72. Referring now to FIG. 18, a plurality of movable carts 72 is positioned on each rail 22 in the rail system 20. It should be noted that the number and position of the carts shown in FIG. 18 is for example purposes only. While, for efficiency and cost considerations, less than a full 360 degrees of the array is manned with mirrors and carts, it is possible to achieve the benefit of a simplified heliostat design of the inventive subject matter using the entire circumference of the rail system 20. The number of carts 72 for each row may be determined by the position of the row from the location of the central receiver and the desired dimensions of the array using the concept of cosine efficiency. The carts 72 in each row are linked together, similar to train cars, with a motorized drive cart 94 at each end or one or more motorized carts 94 interspersed in each row. The motorized carts 94 will be controlled to move the carts 72 back and forth along the rail 22. Each row of carts 72 is in communication with a controller (not shown) to control their movement and track the Sun. The row of carts 72 is movable into positions that maintain the orientation of the row of carts 72 in fixed configuration with respect to the solar azimuth.

Figure 19:
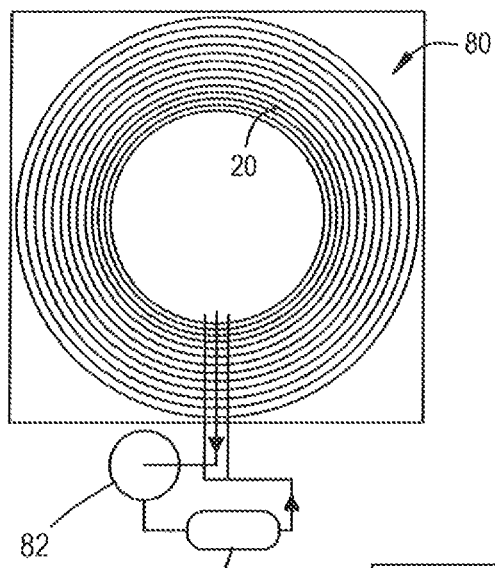
FIG. 19 is a plan view of the solar power collection system having a heat rejection system of the inventive subject matter.

For a solar power plant of any size, which collects and concentrates solar thermal energy to a heat engine, it is possible to sustain the rejection of heat by distribution within the solar power collection area. FIG. 19 is a plan view of the solar power collection system having a heat rejection system 80 of the inventive subject matter that does not consume water. The rail system 20 may be a network of pipes that carry a coolant liquid for a combination of geothermal and radiant heat dissipation in a closed system to carry the rejected heat from the source and throughout the solar power collection area. The pipes may be thermally conductive piping. In an embodiment described above, the rail system 20 is raised above ground to allow heat from the coolant to radiate to the ambient air on all sides along its length. In the rail system 20, a coolant is circulated as necessary to achieve the desired coolant temperature reduction.

Figure 20:
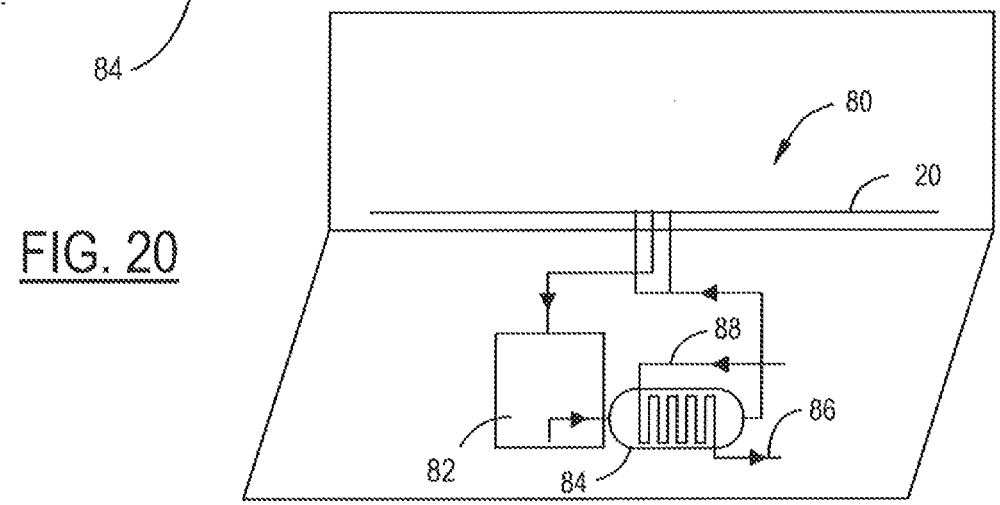
FIG. 20 is a side view of the solar power collection system and heat rejection system of the inventive subject matter.

A sub-grade geothermal reservoir 82 is piped to the rail system 20. The geothermal reservoir 82 holds a primary volume of liquid coolant that is circulated throughout the rail system 20. It should be noted that while a single reservoir 82 is shown, in practice, the reservoir 82 may consist of one or more buried tanks. The geothermal reservoir 82 has storage and cooling capabilities. Referring now to FIG. 20, a side view of the heat rejection system is shown. The reservoir 82 and the condenser 84 are below ground. The dimensions and boundaries of the buried reservoir 82 should be of a predetermined thermal conduct to allow heat accumulated within the coolant to dissipate into the earth all about a surface area of the reservoir 82.

A sub-grade condenser 84 is piped to both the rail system 20 and the geothermal reservoir 82. The condenser 84 exchanges the heat by accepting the thermal energy from the steam and then removes it by another system, such as coolant. Large volumes of coolant are moved through the rail system 12, passed through the condenser 84 and returned to the reservoir 82. The condenser 84 has two systems 86, 88. A first system 86 receives exhaust steam which enters the condenser 84 where it is circulated and turned into condensate. The condensate exits the system as feed water 90 for a boiler, not shown. The second system receives the coolant at a low thermal energy level, so as to readily accept the heat of the exhaust steam, and leaves the condenser at a thermal energy which is nearly equal to any feed water 90.

Figure 21:
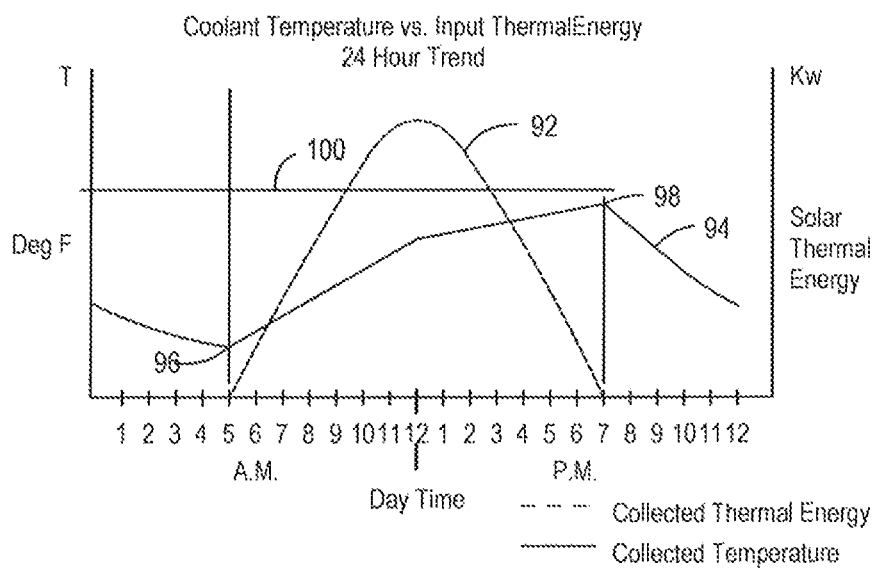
FIG. 21 is a graph of the relationship of solar energy collection and associated energy production with respect to coolant temperature over the course of twenty-four hours.

The geothermal reservoir 82 acts as a heat sink and reserve coolant capacity. The size of the reservoir 82 is determined based on beginning a solar day at ambient temperature and finishing the solar day below a peak operating temperature of the coolant. FIG. 21 is a plot of the relationship between solar energy collection 92 and coolant temperature 94 over the course of a solar day. A solar day beginning at five a.m. shows the coolant at its lowest temperature 96. Energy production increases as solar noon approaches and the coolant temperature rises. By the end of the solar day, a peak coolant temperature 98 is below a maximum operating temperature 100. As coolant continues to circulate through the system, the coolant temperature is returned to ambient by the beginning of the next solar day. The reserve coolant capacity of the geothermal reservoir 82 allows the system to draw coolant as needed during times of peak operating temperature.

Above ground, a radiant array circulates coolant to dissipate heat from the coolant to the ambient air on all sides along its length. FIG. 22 is an exploded perspective view of a pipe rail system of an embodiment of the present invention in which the rail system 20 is combined with the heat radiator system 80. In this embodiment, each rail section 22 has a pipe insert 102 through which the coolant flows.

In another embodiment, shown in an exploded perspective view in FIG. 23, the rail system is separate from the heat radiator system. A mounting bracket 106 is mounted to the bolt pattern 46 of the pedestal 26 and has struts 108, 110 for supporting the heat radiator system. An adjustable base 112 is mounted to the pedestal 26 at the bolt pattern 46 and supports the rail union joint 34 as described hereinabove.

The struts 108, 110 each support a trough section 114 that cradles a section of pipe 116. The pipe 116 is covered by a heat sink section 118, which may be an extruded heat sink as shown in FIG. 23. FIG. 24 is a top view of the heat rejection system 80. The rail system has a slight arc as shown in order to roll the carts 72, 94 in a full circle about the receiver 16. The heat radiator system may be straight sections to ease cost and installation of the system. A mid-rail support 120 may be implemented to add structure support between pedestals. The coolant flows through the heat radiator system on either side of the rail system 20.

In an embodiment of the inventive subject matter, the struts 108 and 110 are lower than the rail system 20 in order to allow the movable carts 72 to move easily about the rail system without interference with the heat rejection system 104.

According to the inventive subject matter, large volumes of coolant is moved through the radiant array above ground, cycled through the condenser and stored in the geothermal reservoir. The system of pipes, condenser and reservoir are closed loop systems. The inventive subject matter has the advantage of eliminating steam and out gassing associated with known heat rejection methods. Further, the inventive subject matter does not consume water for cooling. Further, by dispersing heat back to an ambient environment of the solar collection region, in the above ground design of the radiant array, solar heat which is intended for the ecology is returned, thereby having minimum impact on the environment.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. A heat rejection system for a solar thermal power collector having an array of heliostat mirrors, the heat rejection system comprising:
    a rail system supporting the array of heliostat mirrors, the rail system having a plurality of thermally conductive pipes, wherein at least a portion of said heliostat mirrors are movable along a length of the rail system;
    a reservoir positioned underground and connected to the thermally conductive pipes;
    a condenser connected to the thermally conductive pipes and the reservoir; and
    a coolant means circulating through the thermally conductive pipes, condenser and reservoir;
    wherein the thermally conductive pipes, the reservoir and the condenser are closed loop systems, the heat rejection system operates in the series of closed loop systems to dissipates heat into an ambient environment without the consumption of water.

2. The heat rejection system as claimed in claim 1 wherein the rail system further comprises a plurality of pedestal means positioned to maintain the rail system at a predetermined distance above ground.

3. The heat rejection system as claimed in claim 2 wherein the rail system encases the thermally conductive pipes.

4. The heat rejection system as claimed in claim 2 wherein the rail system is separate from the thermally conductive pipes.

5. The heat rejection system as claimed in claim 4 further comprising a bracket mounted to each pedestal means in the plurality of pedestal means for supporting the rail system and the thermally conductive pipes.

6. The heat rejection system as claimed in claim 5 wherein the bracket further comprises a first support for the thermally conductive pipes on one side of the rail system and a second support for the thermally conductive pipes on another side of the rail system wherein the thermally conductive pipes circulate coolant two sides of the rail system.

7. The heat rejection system as claimed in claim 6 wherein the first and second supports of the bracket are positioned below the rail system.

8. The heat rejection system as claimed in claim 7 wherein the condenser further comprises:
    a first system for collecting exhaust steam, condensing the exhaust steam and returning the condensation to the heat rejection system; and
    a second system for circulating the coolant means, dissipating heat from the condensing exhaust steam and the coolant, and returning the coolant means to the reservoir.

9. The heat rejection system as claimed in claim 7 wherein the reservoir further comprises heat sinking capacity and coolant means storage capacity.

10. The heat rejection system as claimed in claim 1 wherein the condenser further comprises:
    a first system for collecting exhaust steam, condensing the exhaust steam and returning the condensation to the heat rejection system; and
    a second system for circulating the coolant means, dissipating heat from the collected exhaust steam and the coolant, and returning the coolant means to the reservoir.

11. The heat rejection system as claimed in claim 1 wherein the reservoir further comprises heat sinking capacity and coolant means storage capacity.

12. A method for rejecting heat in a solar power collection system having an array of heliostat mirrors, the method for rejecting heat comprising the steps of:
    circulating a coolant means throughout a rail system, the rail system having a plurality of thermally conductive pipes supporting the array of heliostat mirrors, wherein at least a portion of said heliostat mirrors are movable along a length of said thermally conductive pipes;
    circulating the coolant means through a sub-grade reservoir; and
    circulating the coolant means through a condenser;
    wherein excess heat is dissipated by radiation and geothermal conduction without the consumption of water, the dissipated heat being returned to the environment.

13. A method as claimed in claim 12 wherein the step of circulating coolant means through a rail system further comprises the step of circulating coolant means through thermally conductive pipes that are encased in the rail system.

14. The method as claimed in claim 12 wherein the step of circulating coolant means through a rail system further comprises the step of circulating coolant means through a network of pipes that are positioned about and separated from the rail system.

15. The method as claimed in claim 14 wherein the step of circulating coolant means through a network of pipes that are positioned about the rail system further comprises a network of pipes on either side of each rail in the rail system.

16. The method as claimed in claim 15 further comprising the steps of:
    collecting exhaust steam at the condenser;
    condensing the exhaust steam; and
    returning the condensation to the heat rejection system.

17. The method as claimed in claim 12 further comprising the steps of:
    collecting exhaust steam at the condenser;
    condensing the exhaust steam; and
    returning the condensation to the heat rejection system.

* * * * *